United States Patent
Ufheil et al.

(10) Patent No.: US 6,698,624 B2
(45) Date of Patent: *Mar. 2, 2004

(54) DEVICE FOR DISPENSING A FLOWABLE POWDER SUBSTANCE

(75) Inventors: Gerhard Ufheil, New Milford, CT (US); William F. Overbaugh, Lakeside, CT (US); Randall C. Chrisman, Southbury, CT (US); J. Antonio Gutierrez, Kent, CT (US); Donald G. Melanson, Jr., Southbury, CT (US); Gerald Squires, New Milford, CT (US); Geno Piacentini, Norwalk, CT (US)

(73) Assignee: Nestec S.A., Vevey (CH)

( * ) Notice: Subject to any disclaimer, the term of this patent is extended or adjusted under 35 U.S.C. 154(b) by 171 days.

This patent is subject to a terminal disclaimer.

(21) Appl. No.: 10/043,867

(22) Filed: Jan. 11, 2002

(65) Prior Publication Data

US 2002/0145010 A1 Oct. 10, 2002

Related U.S. Application Data

(63) Continuation-in-part of application No. 09/825,744, filed on Apr. 4, 2001, now Pat. No. 6,516,973.

(51) Int. Cl.$^7$ ................................................ B67B 5/00
(52) U.S. Cl. .............................. 222/153.14; 222/561
(58) Field of Search .......................... 222/153.14, 561, 222/413

(56) References Cited

U.S. PATENT DOCUMENTS

| | | | | |
|---|---|---|---|---|
| 2,558,522 A | | 2/1945 | Knapp | 225/21 |
| 2,601,353 A | * | 6/1952 | Woodward | 222/153.03 |
| 4,466,559 A | | 8/1984 | Loader | 222/196 |
| 5,152,428 A | | 10/1992 | Di Gerolamo | 222/80 |
| 5,237,910 A | | 8/1993 | Chigira | 99/282 |
| 5,997,236 A | | 12/1999 | Picioccio et al. | 414/403 |
| 6,250,506 B1 | * | 6/2001 | Geiger et al. | 222/105 |
| 6,516,973 B2 | * | 2/2003 | Chrisman et al. | 222/153.14 |

FOREIGN PATENT DOCUMENTS

| | | |
|---|---|---|
| CH | 594 840 | 1/1978 |
| EP | 0 434 168 A2 | 6/1991 |
| EP | 0 516 168 A2 | 12/1992 |
| EP | 1 089 240 A2 | 4/2001 |
| GB | 1 325 478 | 8/1973 |
| JP | 11149587 | 6/1999 |
| WO | WO 96/35635 | 11/1996 |

* cited by examiner

Primary Examiner—Philippe Derakshani
(74) Attorney, Agent, or Firm—Winston & Strawn LLP

(57) ABSTRACT

The invention relates to a device for cleanly and conveniently refilling a flowable substance in a dispensing device which comprises a container assembly of a container containing a flowable substance; a container holding assembly attached to the container which includes an opening mechanism for securing the opening of the container when the container holding assembly is held in a stable delivery position on a reservoir. An unlatching mechanism is also provided to release the container holding assembly from the reservoir in a convenient way. The invention also relates to the combination of such a container assembly and a reservoir assembly which is especially adapted for securely receiving the container assembly.

49 Claims, 14 Drawing Sheets

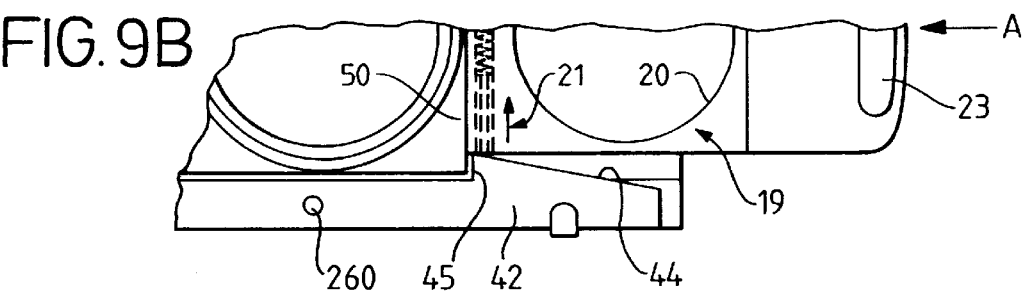
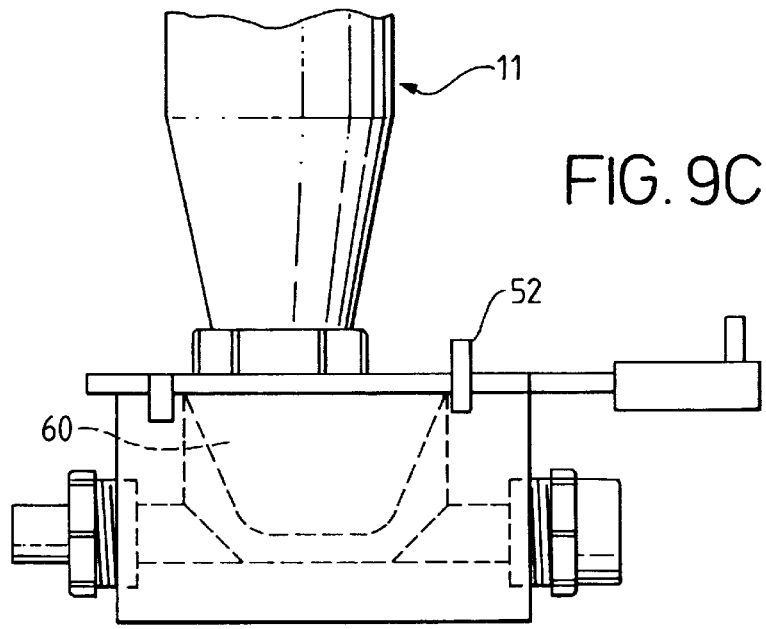
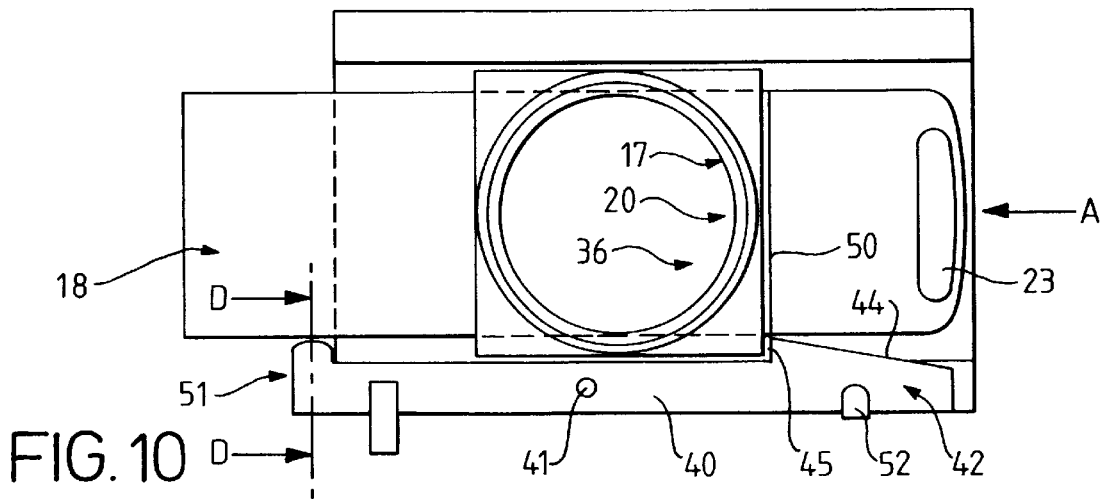

DEVICE FOR DISPENSING A FLOWABLE POWDER SUBSTANCE

This application is a continuation-in-part of application Ser. No. 09/825,744 filed Apr. 4, 2001, now U.S. Pat. No. 6,516,973.

FIELD OF THE INVENTION

The present invention generally relates to a device for dispensing a flowable substance, and in particular to a device for dispensing powder used for preparing a beverage from a beverage machine such as a coffee and/or milk dispensing machine and the like. The invention also relates to a container assembly adapted to such a device. The invention also relates to a system that uses a charging container which can serve as a part of the dispensing reservoir therefore ensuring constant recharge in product of protected and controlled quality.

BACKGROUND

Various automated beverage machines for making hot or cold beverage products are known in the art. In a conventional beverage machine, a metered amount of water-soluble beverage powder, stored in powder refillable canister, and a metered amount of hot or cold water, supplied from a water source, is conveyed into a mixing chamber to produce a beverage or food, which is then dispensed into a cup and served. The refilling of canisters requires time consuming manual operations from the foodservice operator. The operator has usually to refill the canisters by pouring the powder from powder bags, usually flow wrap bags. This operation is not convenient and is time consuming. Furthermore, this can cause significant loss of powder, dusting and hygienic problems due to possible contamination with the outside environment, especially, when air and water sensitive powders are used such as milk powders. Periodic cleaning of the machine is also rendered necessary to avoid a dirty look to the machine as well as to avoid hygiene problems.

Another problem is due to the relative lack of room for the small or medium-size office beverage dispensing systems that requires the operator to be extremely cautious and meticulous in refilling the device with the flowable product stored in bulk. This problem is exacerbated when several reservoirs are positioned in parallel for refilling in a narrow space or volume of the system.

Another problem associated with the dispensing of dry and powdered material from a canister is that such a material is hygroscopic and therefore has very high tendency to form lumps and cakes that might affect the accuracy of the metered dosage of the powder from the machine.

Another problem comes from the lack of protection a flowable food substance endures during the storage in usual hopper systems of dispensing machines. In particular, hygroscopic food powder such as milk powder is quickly affected by the surrounding moisture causing aggregation, lumps, flowing problems, deterioration of the intrinsic properties of the powder over a short period of time. Oxygen may also negatively affect certain ingredients of certain powders such as milk fat because of the rapid oxidation of the lipids, especially in conjunction with increasing water activity of the powder during storage. The existing dispensing systems do not properly preserve the quality of the powder during storage and do not ensure a constant respect of the quality standards.

Therefore, there does not exist a satisfactory device, especially for use as a small food or beverage dispensing machine for an office or home, that would allow the reliable dispensing of flowable substance from a convenient removable package with a high level of cleanliness, convenience and reliability. In particular, there does not exist a device that would provide a substance-containing package that can be adapted in a quick, clean and effective manner to a reservoir and dosing device with the package forming a part or extension of the reservoir. Such a configuration would allow more flexibility in the way the beverage-making machines can be conceived as the reserve of powder would not necessarily be fully part or integral of the machine itself.

In particular, there does not exist also a convenient and easy way for refilling one or more flowable substances in a dispensing device such as a beverage dispensing device and the like that is less labor consuming and may be carried out even in a limited volume of the dispensing system, and the present invention now resolves these deficiencies.

SUMMARY OF THE INVENTION

The present invention provides a device for dispensing a flowable substance in a convenient and quality controlled manner, especially a sensitive flowable food material, which can be more cleanly dispensed and more and rapidly fed and dispensed using less labor time.

More specifically, this dispensing device ensures essentially no loss of the flowable substance, reduces cleaning requirements to a minimum and consequently diminishes the risks of potential hygienic hazards. In addition, this dispensing device may be adapted for various applications such as home or office beverage-making systems of relatively small or reduced volumes. The dispensing device also ensures a better storage of the flowable substance, e.g., a powder, and a better control of powder quality over time in providing a substantially closed environment less subjected to moisture ingress and being capable of receiving food containers packed in packaging materials adapted to the specificity and composition of each food product.

The invention specifically relates to a dispensing device comprising a container holding assembly adapted for receiving a charging container having a flowable substance therein. The container holding assembly and reservoir means possess complementary fitting means for removably securing the charging container on the reservoir means so that the container becomes an extension of the reservoir means. The container holding assembly preferably has opening means for selectively opening the container and being adapted to move from a closed position to an open position and vice versa. The container holding assembly may preferably further have a locking means for initially holding the opening means in the closed position. The dispensing device further comprises reservoir means adapted to receive the container holding assembly for being provided with flowable substance in a delivery position and latching means for securing the container holding assembly to the reservoir means when the container is in the delivery position.

The reservoir means and container holding assembly preferably comprise complementary fitting means that allow an easy engagement and a correct and steady relative positioning of the elements one another to establish flow connection in reliable and safe conditions. The fitting means may preferably comprises single directional guiding means such as longitudinal sliding means.

The reservoir means further comprises release means for releasing the locking means of the container holding assembly. The release means may be coupled to the latching means. The release means is capable of actuating the locking means of the container holding assembly only when the container is secured in the delivery position so that the opening means of the container holding assembly is capable of being moved into an open position to allow flowable substance to freely flow from the container into the reservoir means. The release means is preferably coupled to the latching means so that the release of the opening means of the container holding assembly is simultaneously achieved with the latching of the container holding assembly onto the reservoir means.

In a preferred embodiment, the container holding assembly comprises integrated means for unlatching the latching means of the reservoir means to free the container holding assembly such that the container holding assembly can be removed easily. Preferably, the unlatching means are easily accessible and actuatable by the operator. In particular, the unlatching means are arranged on the container holding assembly to act by pulling on the container holding assembly off the reservoir means for withdrawal of the container. As a result, the withdrawal of the container is rendered more convenient, especially in restricted space conditions. The container and its assembly can be unlatched and removed by manual pulling using only one hand. Even preferably, the unlatching means is arranged to be actuated in the same direction as the main direction the container holding assembly complementary fits along the reservoir means. Therefore, the operation for releasing the container appears more natural for the user.

The unlatching means may preferably include an articulated handle or lever easily accessible by the operator. The handle or lever may connect an actuating arm or an element carrying out a similar function that is capable of forcing on the latching means of the reservoir to disengage the container holding assembly.

In a preferred aspect, the device further comprises a secondary locking means for locking the latching means for more securely engaging the container holding assembly to the reservoir means in the delivery position. The secondary locking means is arranged with respect to the opening means of the container assembly so that it becomes disengaged from the latching means when the opening means of the container holding assembly is moved into the closed position to thus prevent further flow of substance from the container into the reservoir means. Thus, any excess of substance can be prevented from flowing outside of the container when the container is disengaged from the reservoir means. This allows the container to be removed in a clean way even before the container is fully empty.

In a preferred embodiment, the container holding assembly comprises primary sliding means adapted to move the opening means with respect to the container from a closed position to an opening position and vice versa. In addition, the container holding assembly may be guided in sliding engagement onto the reservoir means by secondary sliding engaging means including stopping means capable of stopping the container from movement past the predetermined delivery position. According to a preferred aspect, the primary and secondary sliding means are arranged to move in the same direction so that the engagement of the container assembly and the opening of the container can be carried out sequentially by a substantially continuous sliding motion. Therefore, the container can be properly and rapidly opened in the suitable position with respect to the reservoir means.

In a preferred embodiment, the opening means and primary sliding means form a gate plate that slidably engages a container carriage onto which the container is attached.

Preferably, the container is removably attached to the container carriage by removable connection means. Alternatively, the container may be permanently attached to the container carriage. The container carriage may include a first part of the secondary sliding means adapted to complement a second part of the secondary sliding means of the reservoir means. The gate plate and the container carriage may both be provided with openings that substantially coincide together for the passage of the flowable substance when the container assembly is moved into the opening or delivery position on the reservoir means.

In another embodiment, the reservoir means includes a passage for collecting the flowable substance, which passage extends beyond the openings of the container assembly so that any excess of powder may be wiped from the gate plate and collected through the passage during the closure of the gate plate with respect to the container carriage. Alternatively, the reservoir means may include a first passage adapted to coincide with the openings of the container holding assembly and a second passage distinct from the first passage that is axially aligned with the first passage to collect the excess of flowable substance wiped from the gate plate during the closure of the gate plate. This configuration is effective to prevent substance from soiling the vicinity of the reservoir means but ensures the excess of powder can fall back into the reservoir means as the opening means is returned to the closed position.

The locking means of the container holding assembly advantageously comprises a first resilient member which locks the container carriage in a position in which the opening of the carriage is shut off by a solid closing portion of the gate plate. Also, the latching means of the reservoir means comprises a second resilient member which has a first engaging surface that compresses the first resilient member in response to the sliding engagement of the container holding assembly onto the reservoir means, thereby resulting in the release of the plate gate with respect to the container carriage. The first resilient member is preferably a spring biased blocking element while the second resilient member is a lever having a second surface extending with the first engaging surface, which second surface engages a transversal portion of the container carriage for securely holding it in the delivery position. The reservoir means may be a portion of a hopper that is configured, positioned and adapted to collect the flowable substance as it flows through the container holding assembly. Thus, the container, when opened, forms an extension of the hopper and has a capacity that exceeds the capacity of the hopper portion, to continuously supply the flowable substance to the hopper.

The reservoir means advantageously comprises a dosing assembly located at the bottom of the hopper for receiving flowable substance and for transporting a predetermined amount of flowable substance toward an outlet of the hopper portion. This dosing assembly preferably comprises a rotary auger driven in rotation by an electrically powered motor.

An important aspect of the invention relates to the container assembly itself as taken as an independent part in relation to the reservoir means. For that, the container assembly comprises a container containing a flowable substance and a container holding assembly attached to the container which comprises opening means for selectively opening the container. The opening means is adapted to move from a closed position to an open position and vice versa. Also provided is locking means for holding the opening means in the closed position in which the container is closed by the container holding assembly. The locking means is preferably arranged to be released by release means so that the release of the opening means of the locking means is effected when the container holding assembly is held in a stable or fixed delivery position for delivering the flowable food substance into the reservoir means. The substance can be any powdered food or beverage material, such as milk or milk based products, soup, sauces, mashed potatoes or other dehydrated food products.

In another aspect, the invention relates to a device for dispensing a flowable substance comprising a cartridge holder and a hopper. The cartridge holder is adapted for receiving a charging cartridge that contains a flowable substance, and includes an apertured plate member for selectively opening the cartridge. The plate member is adapted to move from a closed position, wherein a portion of the plate member obturates the cartridge, to an open position wherein the plate member leaves the cartridge open and vice versa. The apertured plate member is preferably initially locked or maintained to the cartridge in the closed position.

The hopper is adapted to receive the cartridge holder in a delivery position for delivering the flowable substance. The hopper is preferably adapted to release the apertured plate member by the effect of the cartridge holder engaging the hopper in the delivery position such that the cartridge holder is capable of being moved from the closed position to the open position, thereby freeing flowable substance from the cartridge that can flow into the hopper. Preferably, the apertured plate is slidably connectable via a carriage attached to the cartridge. The carriage may fit the hopper and preferably further be latched in a fixed delivery position onto the hopper while it effects the ability of the apertured plate to manually slide in the open position.

The cartridge, preferably by its carriage, becomes releasable only when the closed position of the apertured plate is restored so that the risk of spilling flowable material is reduced. This carriage is releasable by pulling the apertured plate in the same direction as the direction for restoring the closed position of the apertured plate. The cartridge may be released by an articulated handle or lever positioned on the front or proximal end of the apertured plate. The handle or lever connects an arm assembly or any equivalent actuating means that opens the latching means of the hopper. As a result, the removal of the cartridge from the hopper requires only a single hand which becomes a genuine benefit in circumstances where little room is available on each side of the hopper.

Another aspect of the invention relates to a method for rapidly and cleanly delivering a powder into a reservoir assembly from a container containing the powder. In this method, a container holder adapted for receiving the container is provided. This container holder comprises apertured means for selectively opening the container with the apertured means being adapted to move from a closed position wherein a portion of the apertured means obturates the container to an open position wherein the apertured means leaves the container open for establishing flow connection, and vice versa. The apertured means is ordinarily locked to the container in a closed position, and is released as the container holder securely engages the reservoir assembly in a delivery position for delivering the flowable substance from the container.

The invention also relates to a method for conveniently removing a charging container from a hopper assembly, especially in a limited space area. The method comprises providing a container holder adapted to attach to the container and having a gate portion adapted to move relative to the container to open or close the container. The method further comprises providing a hopper assembly and providing means for complementary fitting the container holder and the hopper assembly in a fitting direction while the gate portion is capable of moving to open the container. The method further comprises providing means for securing the container. The method further comprises providing means for unlatching the container which acts when pulling the container holder in a direction opposite to the fitting direction. In another aspect, the invention relates to a method for dispensing a flowable food substance in a convenient manner while protecting the quality of the substance delivered comprising providing a charging container having an interface that closes the container and that complementary fits a reservoir of the dispensing device, securely fitting the charging container top-down on the reservoir while the interface complementary fitting onto the reservoir wherein resulting from the interface securely fitted onto the reservoir, the flow communication can be established, leaving the charging container as an extension of the reservoir. The container is generally made of moisture barrier material, and preferably of an oxygen barrier material.

BRIEF DESCRIPTION OF THE DRAWINGS

Preferred features of the present invention are disclosed in the accompanying drawings, wherein similar references characters denote similar elements throughout the several view, and wherein:

FIG. 9B is a top view of a detail showing the unlocking step actuated by the latching element of the reservoir assembly;

FIG. 9C is a side view of the dispensing device of FIG. 9;

FIG. 10 is a top view of the dispensing device of FIGS. 9–9C in dispensing operation;

DETAILED DESCRIPTION OF THE PREFERRED EMBODIMENTS

Figure 1:
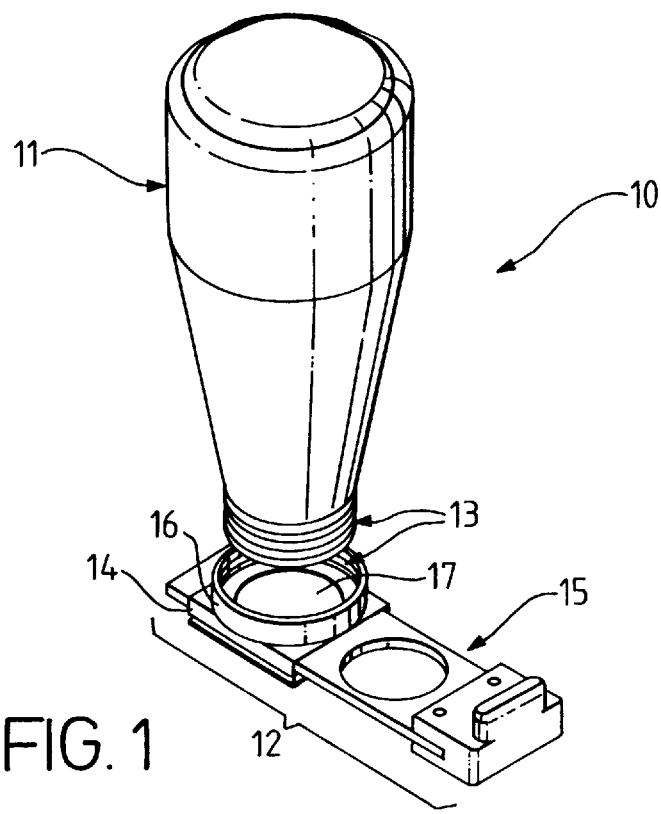
FIG. 1 is a perspective view of a first embodiment of the container assembly of the invention with the container removed from the container holder.
Figure 2:
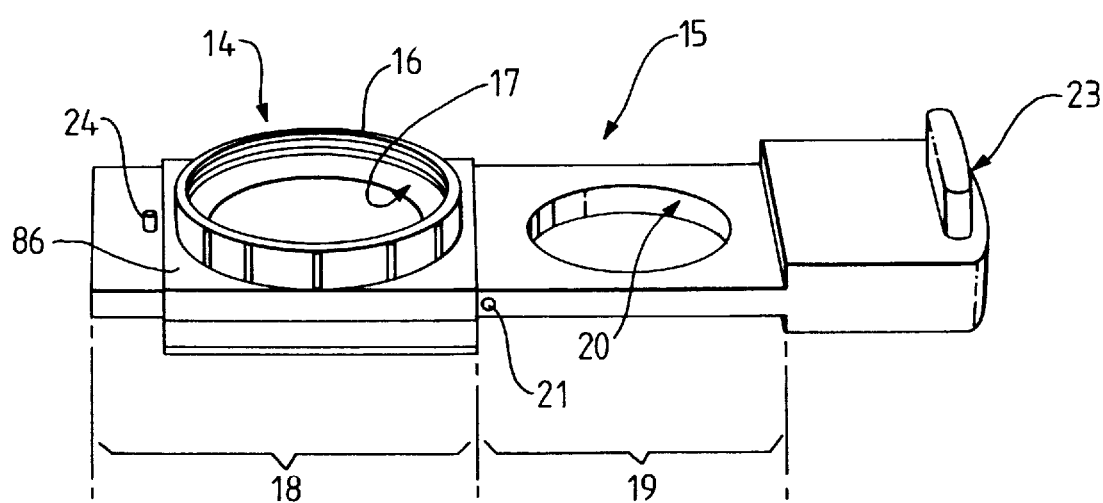
FIG. 2 is a perspective view of the container holder of FIG. 1 without the container.
Figure 3:
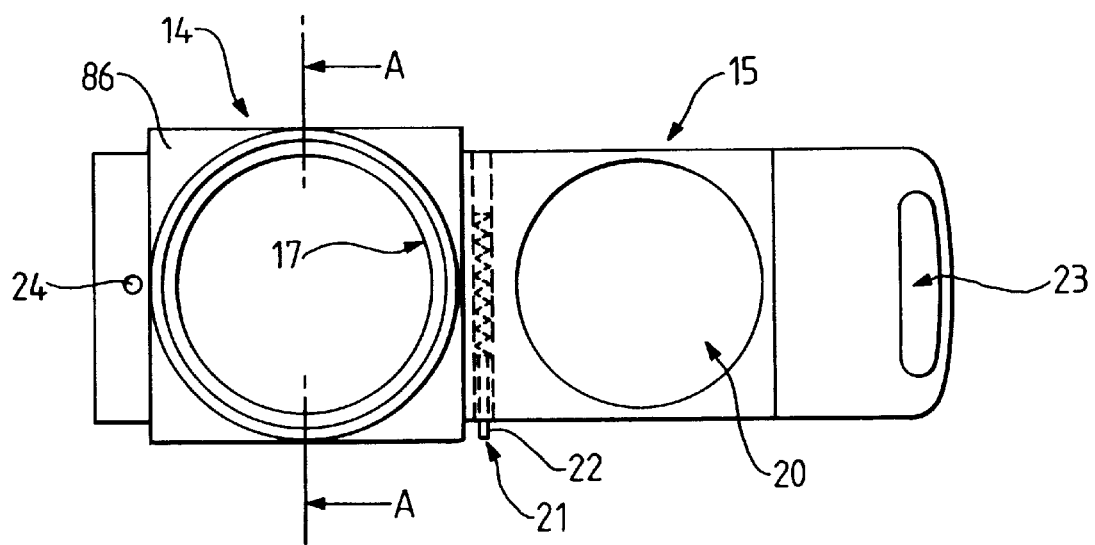
FIG. 3 is a top view of the container holder of FIG. 2.

A first exemplary embodiment of the invention is illustrated in FIGS. 1 to 12 wherein like numerals represent like parts.

Referring to FIGS. 1 to 5, the invention is illustrated as a container assembly 10. The container assembly is comprised of a container 11 and a container holding assembly or "container holder" 12. The container 11 contains a reserve of flowable substance of a capacity adapted to the intended purpose. The flowable substance may preferably be a powdered food or beverage-making component, such as a powder of soluble milk, coffee, cocoa, tea or a combination thereof. Other powdered foods such as dried mashed potatoes or other dried foods, sauce or gravy powders, soup powders or the like way also be used in this invention. The particle size of the powder is not critical so long as the powder can flow though an inverted container, so that any of those used conventionally are useful in this invention.

The charging container may be a plastic, glass or metal bottle or canister. The charging container may preferably have a shape that promotes evacuation until completion (at least 95%, preferably 99% of the fill volume) when used in top-down position as an extension of the reservoir. The skilled artisan knows how to design and configure such cannisters to achieve this feature. Certain products may require the highest level of emptying of the container, while other can tolerate a small remainder. The type of plastic material can be selected depending upon the power to be dispensed to provide low friction characteristics so that the dispensing of essentially all of the powder is facilitated. Preferably, the container is in a monolayer or multi-layer plastic material with good humidity barrier and, optionally, good oxygen barrier. The prevention of moisture entry also contributes to the smooth dispensing of the powder.

The container 11 may be either a removable part of the container holder 12 or a permanent part affixed to the container holder. For obvious economical reasons, it is preferred to have the container removably connected to the container holder by any suitable removable connection means such as screw threads 13, a snap-fitting connection or any equivalent connection means or members. When removable, the container may be a disposable container or a container made of a material that can be recycled or re-used for refilling with new food or beverage material. The container holding assembly 12 preferably comprises opening means which allow a selective opening of the container only when the container holding assembly is in a top-down engagement onto a complementary part of a reservoir means as will be explained herein. The opening means of assembly 12 comprises a container carriage 14 mounted in sliding relationship onto a gate plate 15. The container carriage includes the complementary parts of the connection means 13 and is adapted for securely retaining the outlet portion of the container. For that, a sufficiently steady and rigid protruding connecting portion 16 of the carriage is provided. Other plate members that are capable of sliding or reciprocating movement are also suitable. An opening 17 is provided in the container carriage 14 through the connecting portion 16. The connecting portion 16 is attached on the support base 86 of the container carriage.

The gate plate 15 is an elongated plate member having mainly two distinct sliding portions along which the carriage may slide. The gate plate 15 comprises a first obturating portion 18 and a second apertured portion 19. The apertured portion has an opening 20 of a size which preferably substantially matches the size of the opening 17 of the carriage although other sizes can be used if desired.

As the container holding assembly is taken as an independent part of the rest of the dispensing unit, the gate plate is arranged so that the opening 17 of the container carriage is initially closed by the solid obturating or closing portion 18. The container carriage is prevented from slidably moving along the gate plate by a locking means 21 located between the two portions 18, 19 of the gate plate. The locking means 21 may be, for instance, a spring biased pin or finger like member 22 that protrudes outwardly from a side of the gate plate. The pin or member 22 is arranged so that it holds the container carriage on a position in which the opening 17 is obturated by the obturating portion 18 of the gate plate. The pin or member 22 is of sufficiently small size so that it cannot be easily manipulated or compressed by a user. The gate plate 15 further comprises stop means such as a fixed pin or finger-like member 24 at the distal end 230 of the gate plate to prevent the carriage from leaving the gate plate and which maintains, with the locking means 21, the carriage in a substantially fixed position in which the container is obturated. On the other end or proximal end 231 of the gate plate is provided a handle 23 to permit easy manipulation of the container assembly during the loading operations on the reservoir means as will be further explained herein.

Figure 4:
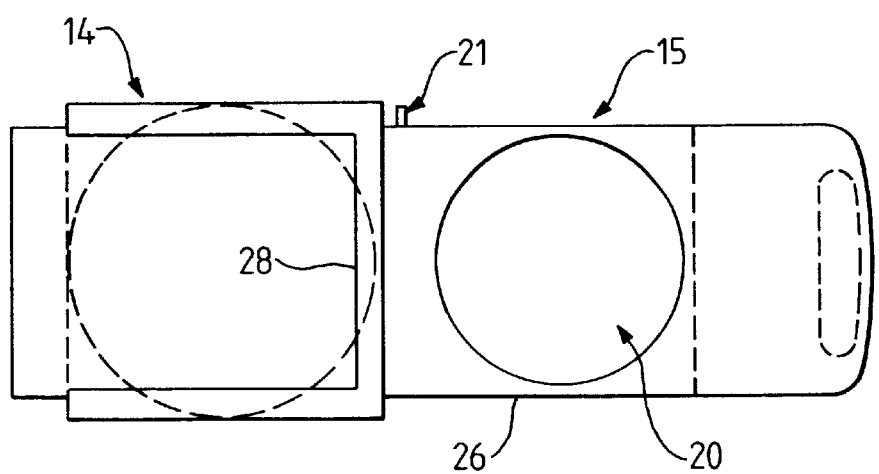
FIG. 4 is a bottom view of the container holder of FIG. 2.
Figure 5:
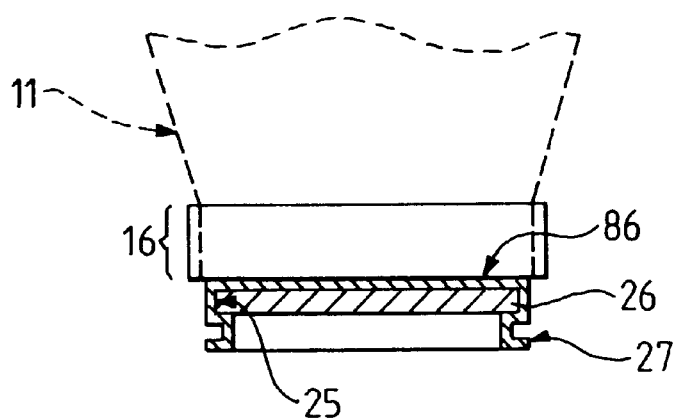
FIG. 5 is a cross-sectional view along line A—A of FIG. 3.

FIGS. 4 and 5 show details of the construction of the container holding assembly which comprises primary sliding means between the gate plate and the container carriage. More particularly, the carriage is provided with internal side rails 25 adapted for engaging the narrowly shaped sides 26 of the gate plate. The primary sliding means 25, 26 enable the container carriage to move along the gate plate between a closed position to an open position when the locking means 21 is compressed or otherwise disabled.

The container carriage 14 further comprises a first part of secondary sliding means in the form of external side rails 27 that are adapted to guide the carriage onto the reservoir means as it will be further explained. In addition, at the bottom of the carriage is provided a transversal abutting portion 28 which serves as a stopping part of the carriage when engaged in the reservoir means, as it will also be further explained herein.

Figure 6:
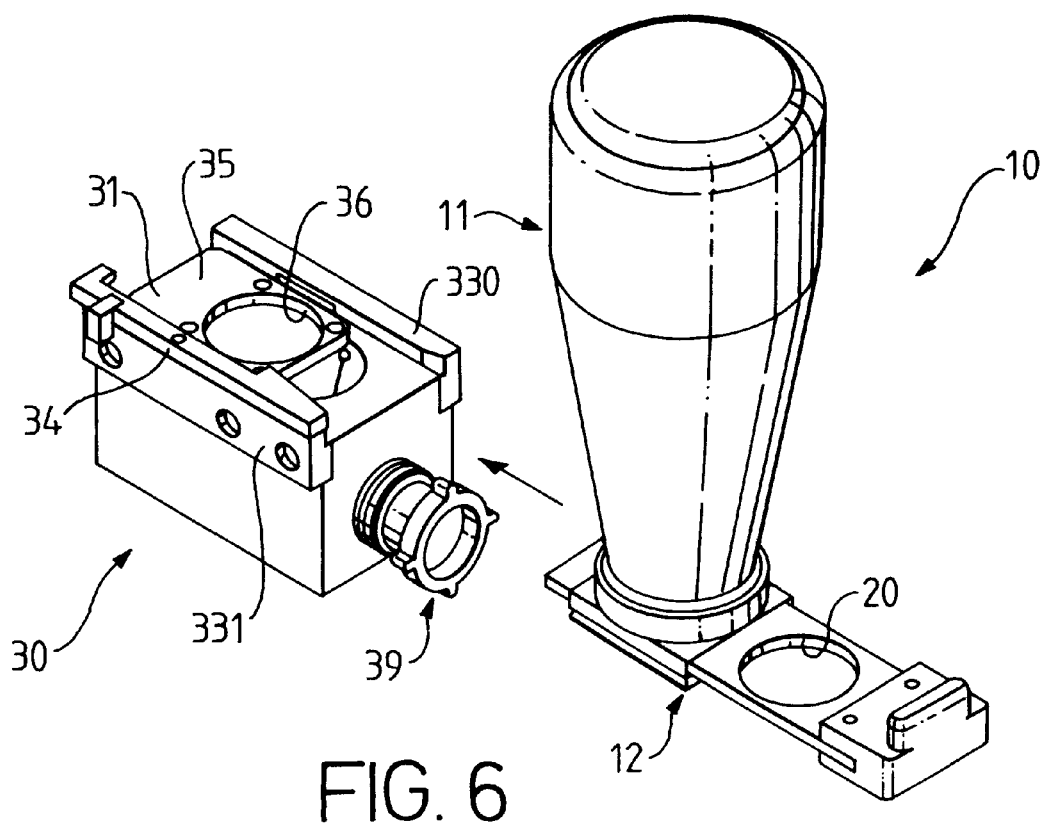
FIG. 6 is a perspective view of a first embodiment of a powder-dispensing device of the invention including the container assembly and the reservoir assembly of FIGS. 1 to 5 before fitting together.
Figure 7:
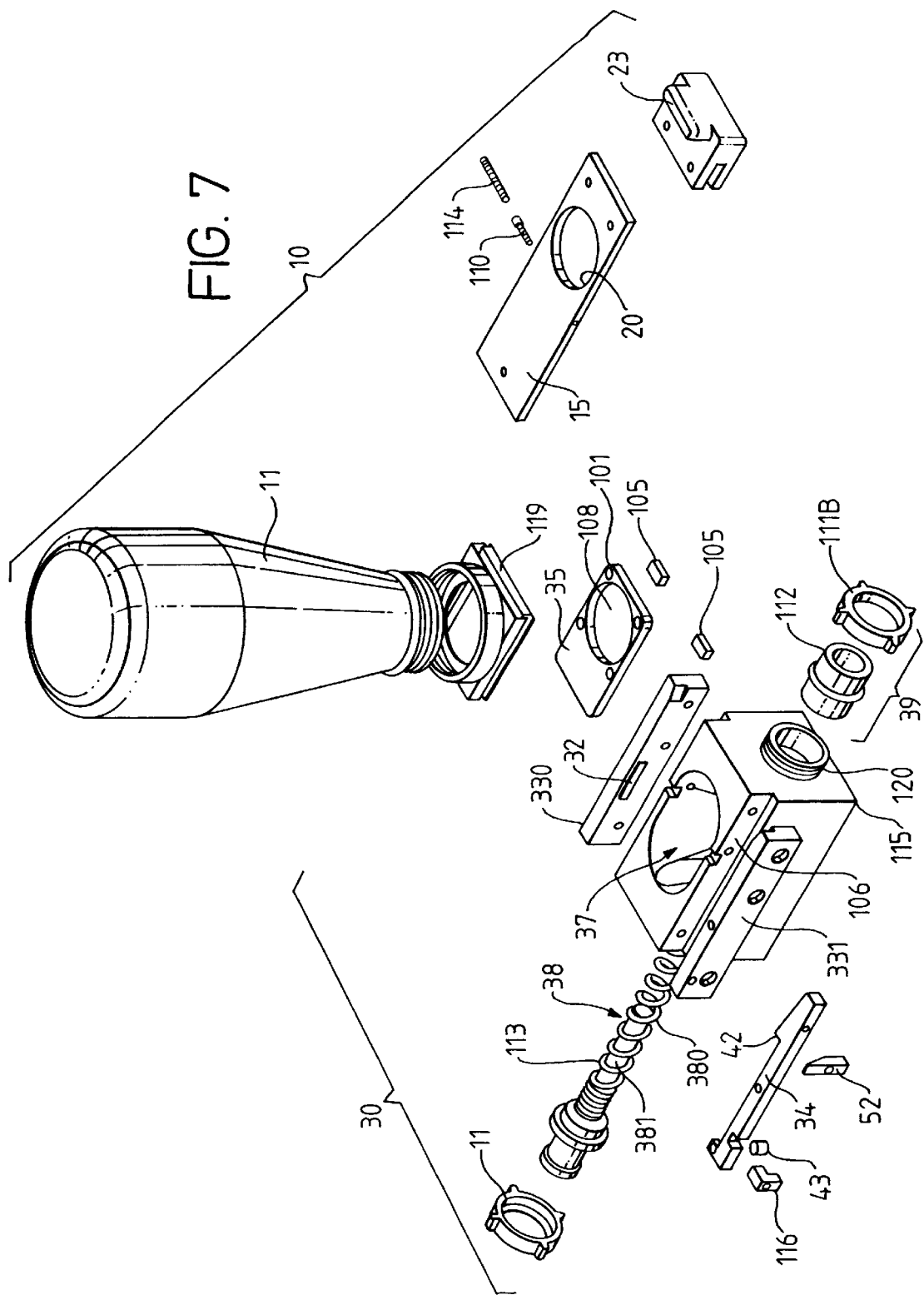
FIG. 7 is a perspective exploded perspective view of FIG. 6 showing the various elements constituting the powder-dispensing device of the invention.

FIGS. 6 and 7 show a device for dispensing a flowable substance of the invention before engagement for dispensing of the substance. The device comprises the container assembly 10 as previously described and a reservoir assembly or hopper device 30 adapted to receive the holder 12 in a suitable delivery position for delivering the flowable substance from the container 10.

The reservoir assembly 30 is intended to be mounted as a permanent part of a more complete beverage-dispensing unit. The reservoir assembly includes a loading area 31 for accommodating the holder 12 in sliding engagement along guiding rails 32 that cooperate in engagement with the external rails 27 of the container carriage. The loading area is further laterally demarcated by upwardly oriented sidewalls 330, 331 that help to guide the sides of the holder 12. Onto one of the sidewalls 331 is mounted a latching mechanism 34 which has the function of securing the holder when the holder has come into place at the proper delivery position. The loading area has in its central part a hopper insert 35 having the configuration of a plate with an opening 36 of about the same dimensions as the two openings 17, 20 of the holder thereby demarcating the intended delivery position of the device. The hopper insert has sidewalls which form on each side with the inner surface of the upwardly oriented sidewalls 330, 331 a longitudinal clearance 350 that provides further guidance for the container carriage. The hopper insert thus participates in providing stability of the container holding assembly.

The reservoir assembly further provides a main elongated cavity 37 extending longitudinally along the loading area for collecting and distributing the powder that is located below the hopper insert 35. The cavity 37 needs to be longer than the opening 36 so that the powder can evenly distribute in the hopper part. The cavity comprises sloped walls to direct the flow of powder in the bottom. In particular, the cavity may include sloped walls forming an angle of between 10 to 30 degrees, preferably 15 to 23, and more preferably 18 to 20 degrees with respect to the direction of gravity. A dosing means 38, preferably a rotary auger or screw driven via an electrically powered motor (not shown), occupies the bottom of the cavity 37. The dosing means is arranged for dosing a pre-metered amount of powder transported by the screw toward an outlet assembly 39 of the reservoir assembly.

FIG. 7 is an exploded view of the component parts that makes up the container assembly 10 and reservoir assembly 30. For the container assembly 10, a canister 11 is releasably attached to a bottle carriage 14 by mating threads or by a snap lock connection. Valve slide plate 15 slidably engages the bottle carriage 14 through passageway 119. After the plate is slid into the passageway, it is secured thereto with a locking means consisting of a bullet 110 and an engagement spring 114 is associated with bullet 110. A valve slide handle 23 is positioned and secured onto the proximal end of the valve slide plate for grasping and movement of that plate.

Reservoir assembly 30 includes housing 115 which includes the elongated cavity 37 and an internal bore which receives auger 113. The auger is secured to a threaded boss on the housing by nut 111A and urges through outlet assembly 39 which includes collar 112 secured to a housing boss 120 by nut 111B.

Hopper insert 35 is secured to housing 115 by connection means 101. A latching mechanism 34, which includes a spring 43, a stop 116 attached to the sidewall 331 and a latch lever 52, has a ramp-shaped latch head 42 which engages the valve slide plate to secure it in the dispensing position.

In reference to FIGS. 8 and 8A, 9 and 9A, the latching mechanism 34 of the reservoir assembly is resiliently connected to the sidewall 331. More particularly, the latching mechanism is comprised by an elongated lever 40 mounted in rotation along axis 41. At one end of the lever is provided a ramp-shaped latch head 42 adapted to both secure the container carriage in place and engage the locking means 21 as will be further explained herein. At the other end of the lever, is provided a spring element 43 that is arranged between sidewall 331 and lever 40 to permanently urge the latch head in closing configuration; i.e., in a direction oriented toward the interior of the loading area. The latch head 42 is shaped in the form of a ramp surface 44 tapering outwardly that allows a smooth opening of the latching mechanism as the holder is loading onto the reservoir assembly. The first surface 44 extends by a second surface 45 forming a hook which secures the container carriage when sufficiently engaged along the loading area; i.e., when in the suitable delivery position in which the openings 17 of the carriage comes above the opening 36 of the hopper insert 35.

Figure 9:
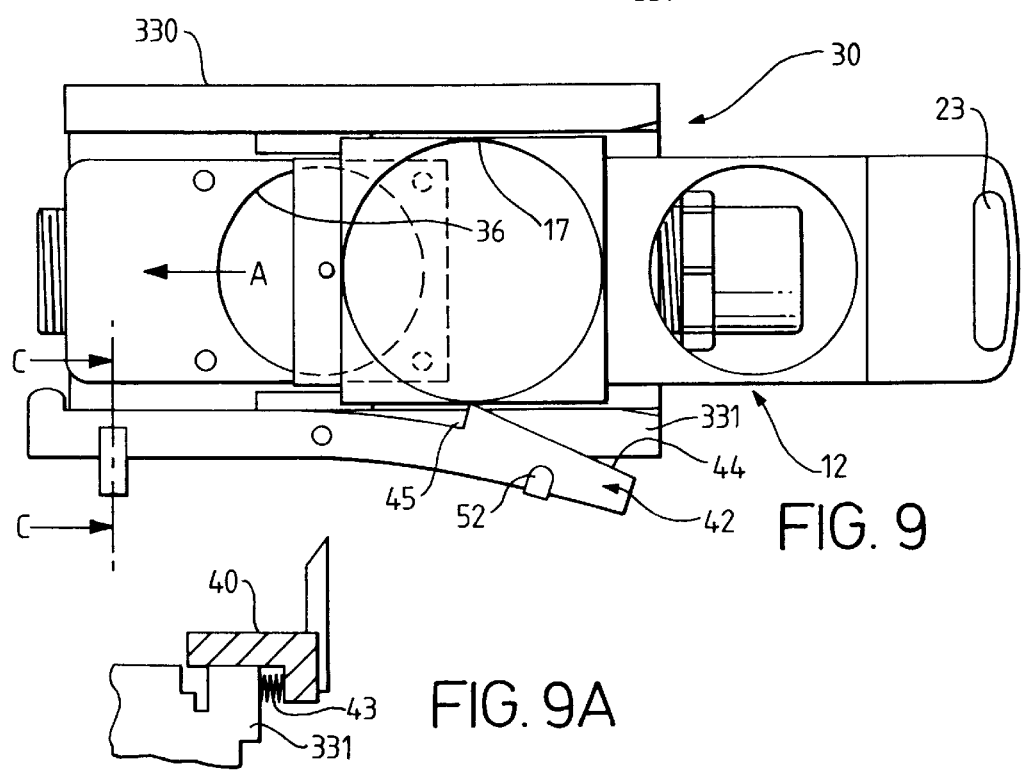
FIG. 9 is a top view of the dispensing device at the time the container holder is engaging the reservoir assembly.
Figure 9A:
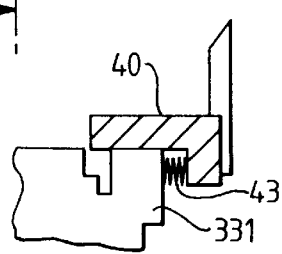
FIG. 9A shows a detail taken along line C—C of FIG. 9.

FIGS. 9 and 9A show the beginning of the loading operation of the container holder 12 onto the reservoir means 30 in which one sidewall of the container carriage exerts a reaction force onto the latch head 42 when engaging between the sidewalls 330, 331 in the loading area. In that configuration, the lever moves backward and its compression spring 43 is compressed (FIG. 9A). For loading of the container holder, the user pushes on the handle 23 in the longitudinal direction of arrow A. Due to the presence of spring-biased locking means 21 protruding from the side of the gate plate 15 to retain the carriage 14, the carriage is held in a closed position and therefore is prevented from sliding along the gate plate 15. The size, shape and capacity of the reservoir means is not critical and any suitable reservoir design can be routinely determined by one of ordinary skill in the art.

Figure 10A:
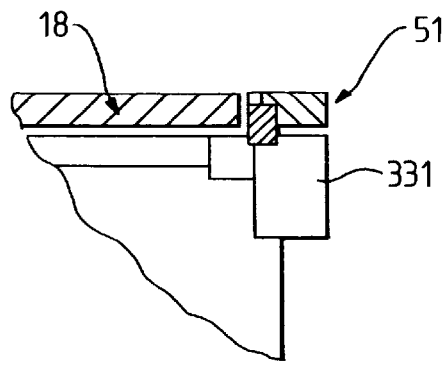
FIG. 10A shows a detail of the device along line D—D of FIG. 10.
Figure 10B:
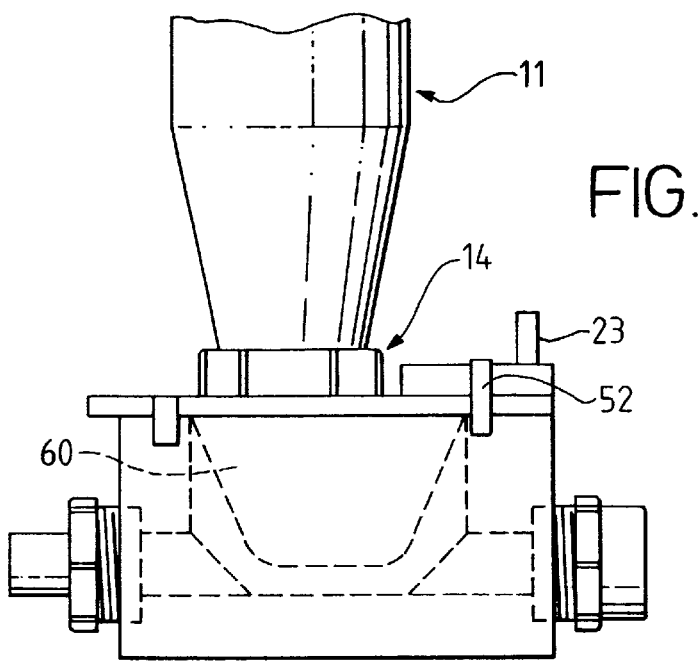
FIG. 10B is a side view of the dispensing device in the position of FIG. 10.
Figure 11:
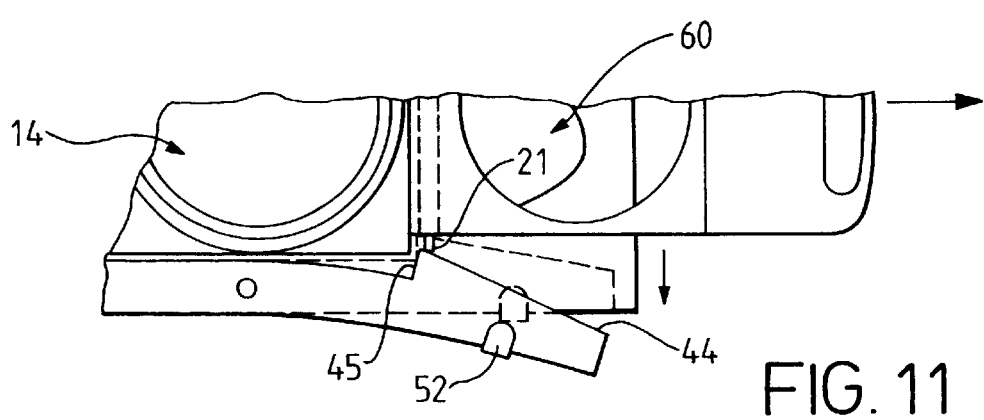
FIG. 11 shows a top view of a detail when unlocking the container holder to carry out removal of the container holding assembly.

FIGS. 9B and 10 illustrate the position when the carriage comes above the opening 36 of the hopper which corresponds to the delivery position. The latch head 42 moves inwards with its first inward surface or ramp portion 44 compressing the spring biased blocking element 21. Simultaneously, the second transversal surface or retaining portion 45 of the latch head engages the transversally transversal outwardly raising edge 50 of the container carriage to secure the container carriage in the delivery position. In this locking configuration, the gate plate can be released with respect to the container carriage since the blocking element 21 does no longer block on the sidewall of the carriage. Therefore, the plate gate can be moved in direction A by further exerting a pushing action on the handle 23 until the opening portion 19 of the plate gate is moved along the container carriage. The plate gate is stopped in place by abutting on the container carriage along transversal edge 50 when the opening 20 of the opening portion conforms to the openings 17 and 36. As a result of the motion of the gate plate, the container is opened and powder contained in the container can flow and fill the cavity of the hopper through the opening 36 of the hopper insert 35. In this delivery configuration, the container holding assembly is maintained in a stabilized secured position that allows the container to form an extension of the reservoir for the powder in the dispensing device. Therefore, the capacity of the reservoir does not necessarily need to match the capacity of the reservoir but preferably exceeds the capacity of the reservoir such that the container remains secured to the reservoir so that it fills the reservoir on a continuous basis until it is completely emptied during operational use of the dispensing device.

In this delivery position with all the openings 17, 20, 36 being coincident with one another, the latching mechanism 34 is securely locked in the configuration where it engages the container carriage so that the container carriage cannot be removed or moved backwards unless the plate gate is returned into a closed position; i.e., in which the obturating portion 18 replaces the opening portion 19 through the container carriage. For that, the container carriage is provided a secondary locking means 51 of the latching mechanism as better illustrated in FIG. 10A that engages the obturating part of the plate gate when in extended opening position along the loading area. As a result, the lever 40 is prevented from opening; i.e., rotating outwards, therefore keeping the container carriage in a secure position for delivery.

If one wants to remove the container holding assembly 12 from the reservoir assembly, for instance, for replacing the container by a new one, it is necessary to re-close the container carriage by pulling on the handle 23; i.e., exerting a pulling force in direction opposite to direction A, until the obturating portion 18 is sufficiently cleared from the blocking means 51 of the latching mechanism. The opening of the latching mechanism is further obtained by exerting a pulling action on the handling member 52 as particularly shown in FIG. 11 to disengage the engaging surface 45 from the transversal sidewall 860 of the container carriage. When the container carriage is released from the latching mechanism, the entire container assembly can be removed by further pulling on handle 23 while the container remains closed by the plate gate to prevent remaining powder from soiling the place. Therefore, the container is securely closed by the container holder before the container can leave the hopper means so that ensuring that no powder left in the container could soil the proximity of the device. Another advantage is that the container can be replaced before it is fully empty if, for instance, there is a need to change the type of food substance in the dispensing device.

As a further beneficial aspect of the invention, the cavity of the hopper means is shaped so as to provide an extended volume area 60 that extends beyond the hopper insert 35 so constituting a volume adapted for receiving an excess of flowable substance that is wiped when the gate plate is re-closed with respect to the container carriage. The extension of the volume is provided on the closure side of the container holder; i.e., on the side where the gate plate pulled back for closing the container carriage. Wiping of the powder may be obtained as a result of the powder which may be retained in the thickness of the opening 20 of the plate gate at the time the plate gate is actuated for re-closing. As a result of the extended cavity configuration, there is no risk of spilling powder outside of the reservoir.

Figure 8:
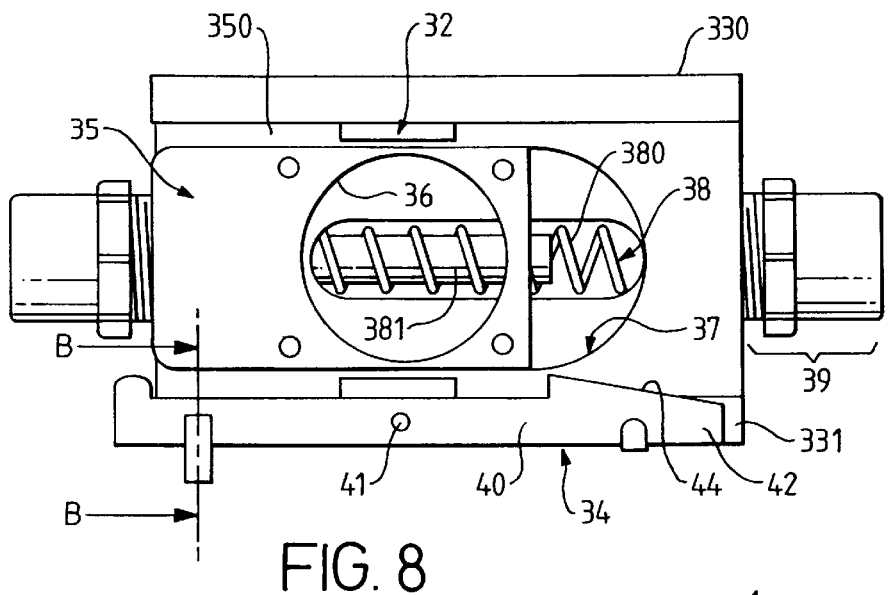
FIG. 8 is a top view of the reservoir assembly of FIGS. 6 and 7.
Figure 8A:
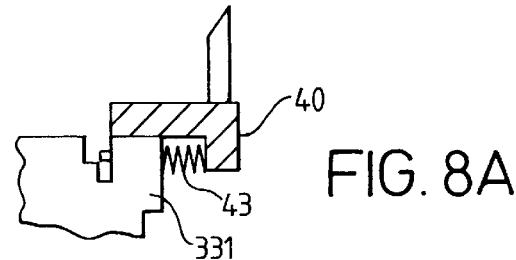
FIG. 8A shows a detail taken along line B—B of FIG. 8.

As illustrated in FIGS. 7 and 8, the dosing means of the reservoir assembly 30 may be specifically designed to move the powder located in the extended cavity portion 37; i.e., in the front of the reservoir, faster than in the rest of the cavity; i.e., in the rear of the reservoir. For that, the auger comprises two distinct portions; a front portion of high volumetric displacement and a rear portion of comparatively lower volumetric displacement. A volumetric displacement screw 381 extends along the two portions while a means 381 for restricting the displaced volume of the screw is only placed in the lower volumetric displacement portion. Such a means may preferably be a solid insert occupying the internal volume of the volumetric displacement screw.

According to one important aspect of the invention, the reservoir assembly is of a limited storage capacity as compared to the capacity of the container. The container is intended to play the role of a storage extension of the reservoir it is operational on the reservoir. This allows the container to be used as a continuous source of supply of the powder during dispensing until, of course, the container is emptied. Also, the assembly mechanism as described complies with the exigencies of stability and safety necessary for this intended purpose.

Figure 12:
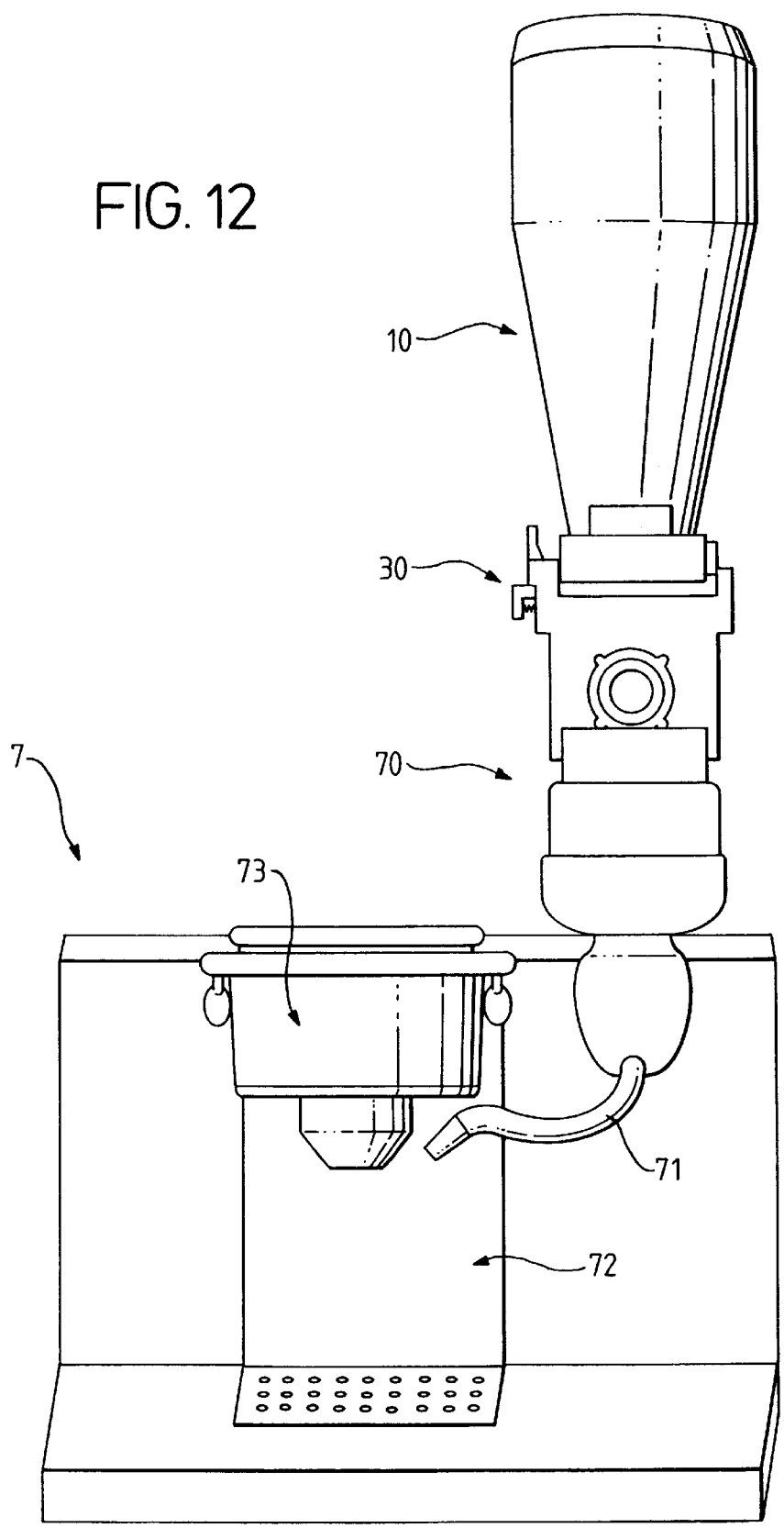
FIG. 12 illustrates an example of the dispensing device mounted on a home or office beverage coffee machine.

FIG. 12 illustrates a beverage-making machine that incorporates a dispensing device of the invention. The machine 7 includes the dispensing device 10, 30, shown in engaged position, which is connected to a mixing/whipping system 70. Pre-metered powder is dosed in the reservoir assembly 30 and delivered through outlet 39. The dose of powder falls in the bowl of the mixing/whipping system 70 a bowl and it is mixed with a pre-metered amount of hot water. The resulting mixture is dispensed through piping 71 to a dispensing area 72. The machine further comprises a unit for preparing coffee beverages from a brewing assembly 73 capable of making brewed coffee preparations. For instance, the container of the dispensing device would preferably contain milk powder that are added to the coffee preparations to allow cappuccino or latte beverages to be prepared. In an alternative embodiment (not shown), the powder dispensing device 10, 30 including the whipping means 70 and delivery tubing 71, could be installed as a separate unit of a stand-alone dispensing device. For that, the various components of the device can be protected and hidden within a nice looking closed housing and more than one dispensing device 10, 30 in fluid connection with one or more whipping means 70 can be provided in a single housing.

A second embodiment of the invention is illustrated in FIGS. 13 to 19. For the sake of simplicity and clarity, the like numerals represent like parts as compared to the first embodiment of the preceding figures. Therefore, the aforementioned description is equally valid for this second embodiment regarding the like parts.

Figure 13:
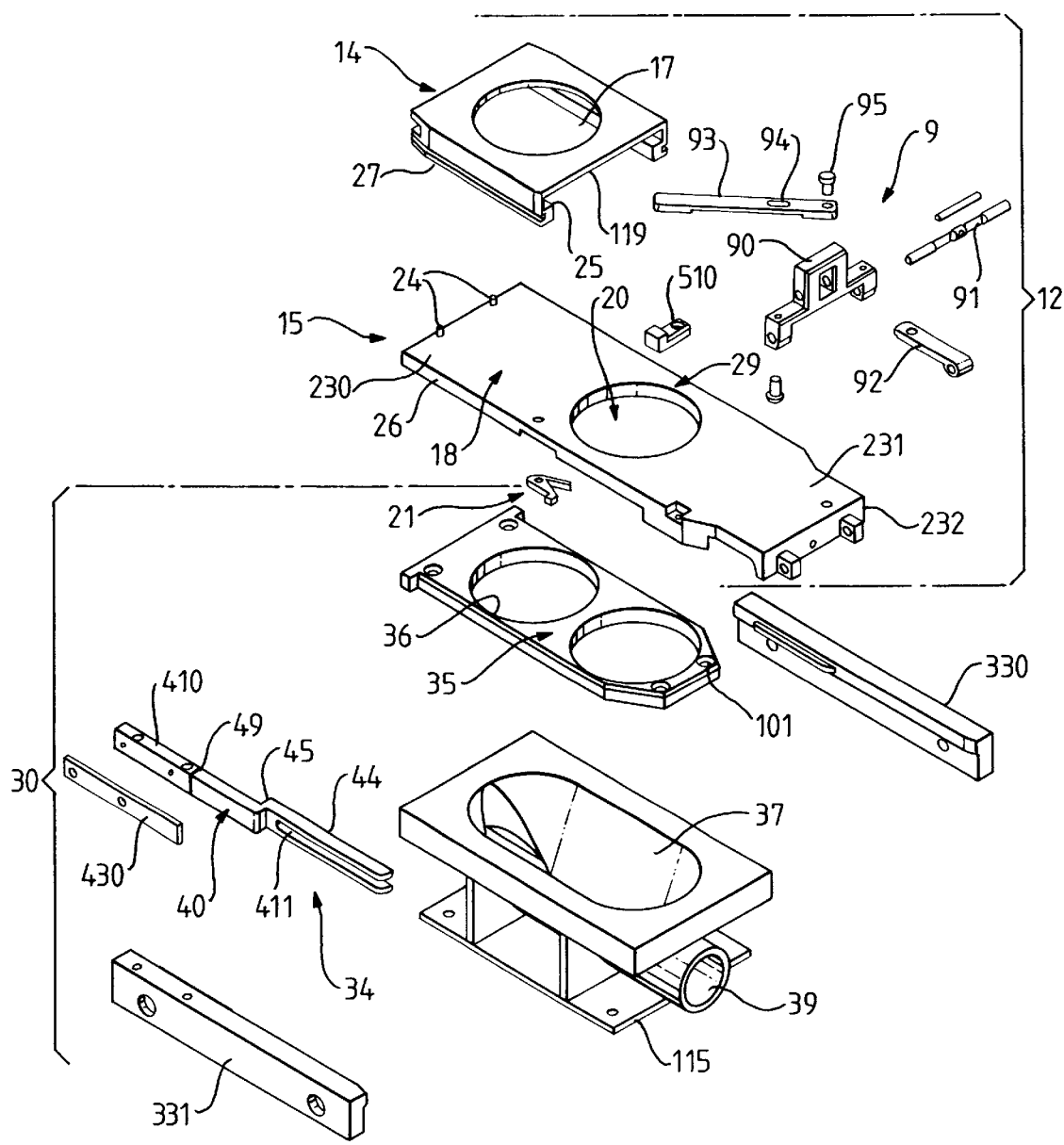
FIG. 13 is a perspective exploded perspective view according to a second embodiment of the flowable substance dispensing device of the invention.

FIG. 13 shows in exploded view details of the construction of both the container holding assembly 12 and the reservoir receiving assembly 30. For the container holding assembly, a container carriage 14 is adapted to connect by any suitable connection means (not shown) to a container such as a substance-containing bottle and the like (not shown) in a top-down position with the opening of the bottle matching the opening 17 of the carriage. A gate plate or valve slide plate 15 engages the bottle carriage 14 through passageway 119 between guiding inner sides 25. The carriage 14 can be maintained in the obturating portion 18 of the gate plate by means of blocking element 21 placed at the limit of the opening portion 19 and by stops 24 placed at the distal end 230 of the gate plate. In this embodiment, the blocking element is a resilient finger-like member that is mounted in a recess provided in the bottom surface of the gate plate. The blocking member has a spring-like portion and a protruding portion forming a finger elastically protruding on the side of the gate plate to block the rear edge of the carriage 14. The blocking member may preferably be made of a single molded plastic piece. On the opening portion, the plate provides an opening 20 that is intended to substantially match the opening 17 of the carriage in a flow delivery position on the reservoir.

The reservoir assembly includes a housing 115, an elongated cavity 37 with internal bore and an outlet 39. A hopper insert 35 is secured onto the upper surface of the housing by any suitable fixed connection means. The loading area 31 of the reservoir assembly is also demarcated by upwardly oriented sidewalls 330, 331 secured to the housing for laterally delimiting a passageway for the container holding assembly 12. A latching mechanism 34, mounted on the sidewall 331, includes a latch lever 40 with a first engaging portion 44, a second transversally oriented retaining portion 45 and a connection portion 410 adapted to connect to the sidewall 330. The connection portion is made flexible by means of a slot 49 and reinforced in elasticity by a leaf spring 430. Therefore, the latch lever 40 can flex in an outward direction when an outwardly oriented force is applied on the engaging portion 44.

In this embodiment, the container holding assembly 12 includes an unlatching device 9 capable of automatically releasing the carriage 14 from the latching mechanism upon manually activating a lever mechanism positioned at the proximal end 231 of the gate plate 15. The benefit of this unlatching configuration is primarily to enable easy and quick disengagement of the container holding assembly from the reservoir means even when the device is installed in a very confined space. The unlatching mechanism 9 comprises a lever means with a lever or handle 90 articulated to the front edge 232 of the plate about a pivot axle 91, which in turn is positioned transversally to the engaging direction of the assembly in the reservoir and in abutting relationship with the front edge 232 to allow the lever means to be rotated from front to rear in a pulling effort. The lever means connects to a rotating pushing arm via a longitudinally oriented transmission rod 92. The pushing arm transfers the front-to-rear rotation movement of the lever into an outward transversal thrust on the latch lever. This is achieved by mounting the pushing arm in rotation on the plate gate on pivot point 95 and articulating it with transmission rod 92 at oblong shaped pivot point 94 slightly offset from pivot point 95 so as to form a toggle joint.

The gate plate further includes a secondary locking means adapted to lock the latching mechanism when the container holding assembly is opened into a delivery position onto the reservoir assembly. The locking means includes an abutting member 510 comprising a reduced portion intended to slidably engage a longitudinal slit 411 of the latch lever and an abutting enlarged portion that blocks the movement of the latch member in a direction outward of the latch lever. The abutting member is positioned along the side of the gate plate in a location suitable for producing the locking effect when the gate plate is fully engaged in open position of the carriage but disengages from the latch lever when the gate plate is withdrawn and the latch forced in opening by means of the unlatching mechanism 9.

Figure 14:
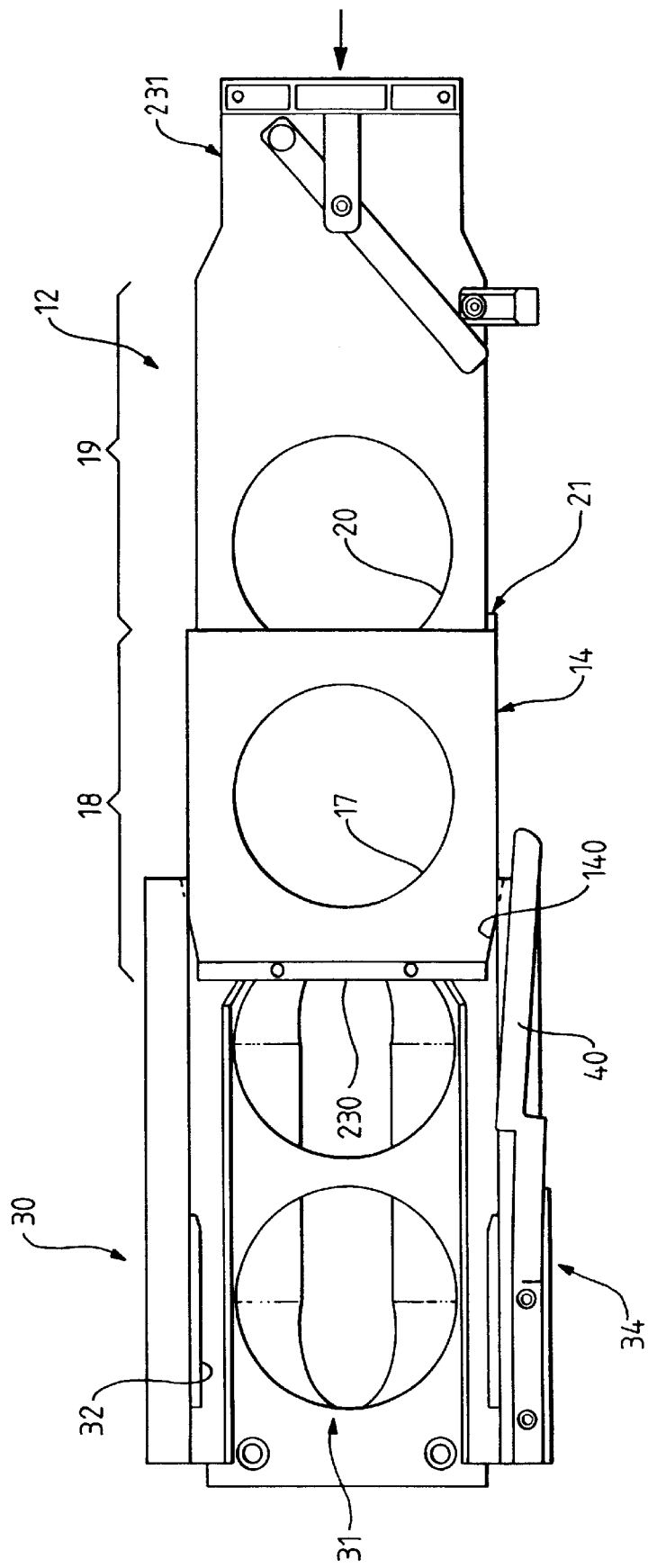
FIG. 14 is a top view illustrating the preliminary engaging stage of the container holding assembly on the reservoir assembly according to the embodiment of FIG. 13.
Figure 15:
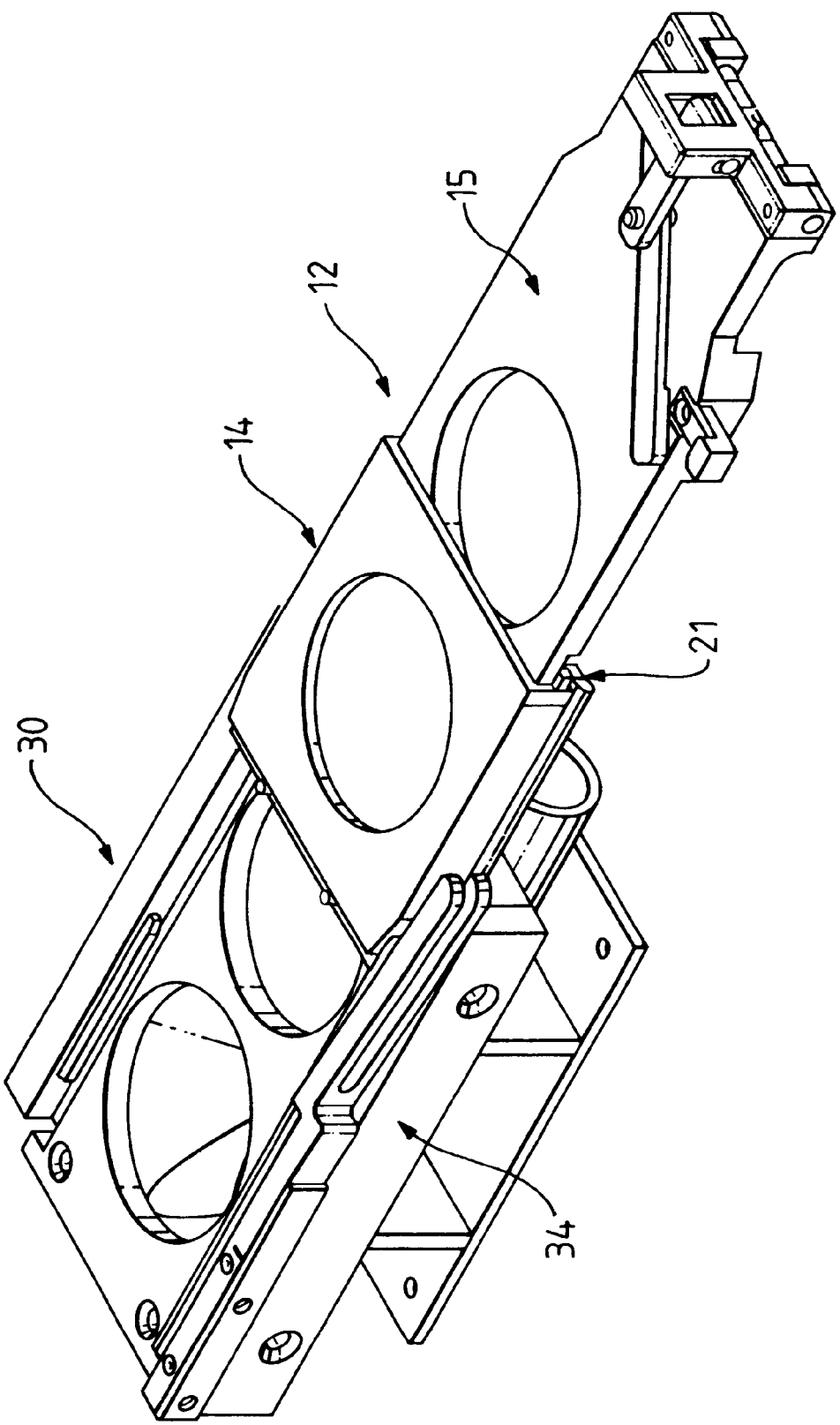
FIG. 15 is a perspective view of the embodiment of FIG. 14.

Turning now attention to the operational aspects of this device, with particular reference to FIGS. 14 and 15, the container holder 12 loads on the reservoir 30 by engaging the distal end 230 of the gate plate with the carriage in closed configuration along the loading area 31. It can be noted that the carriage 14 has tapered engaging side edges 140 to facilitate the self-centering of the holding assembly. Upon the effect of introduction of the container holding assembly, the latch lever 40 is urged to move outward. In this loading configuration, the gate plate 15 is prevented from sliding along the carriage 14 by locking means 21 that block the carriage so that the flow of substance is prevented.

Figure 16:
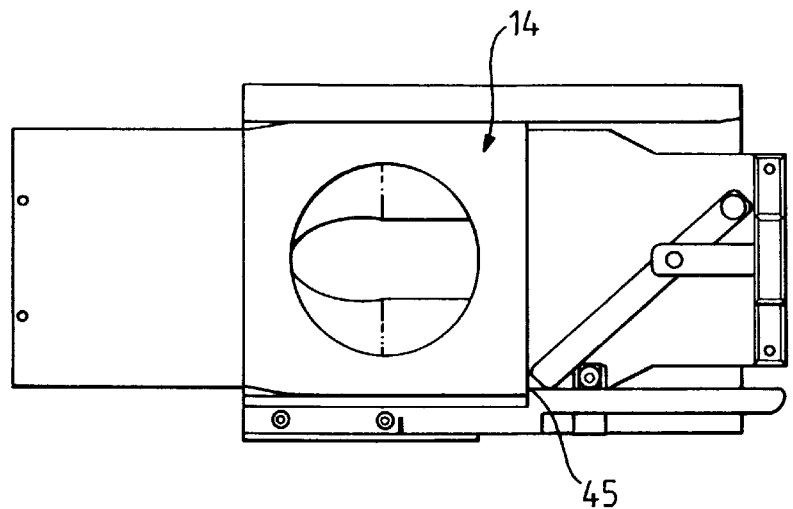
FIG. 16 is a top view illustrating the opening of the container holding assembly once secured on the reservoir assembly in the embodiment of FIGS. 13 to 15.
Figure 17:
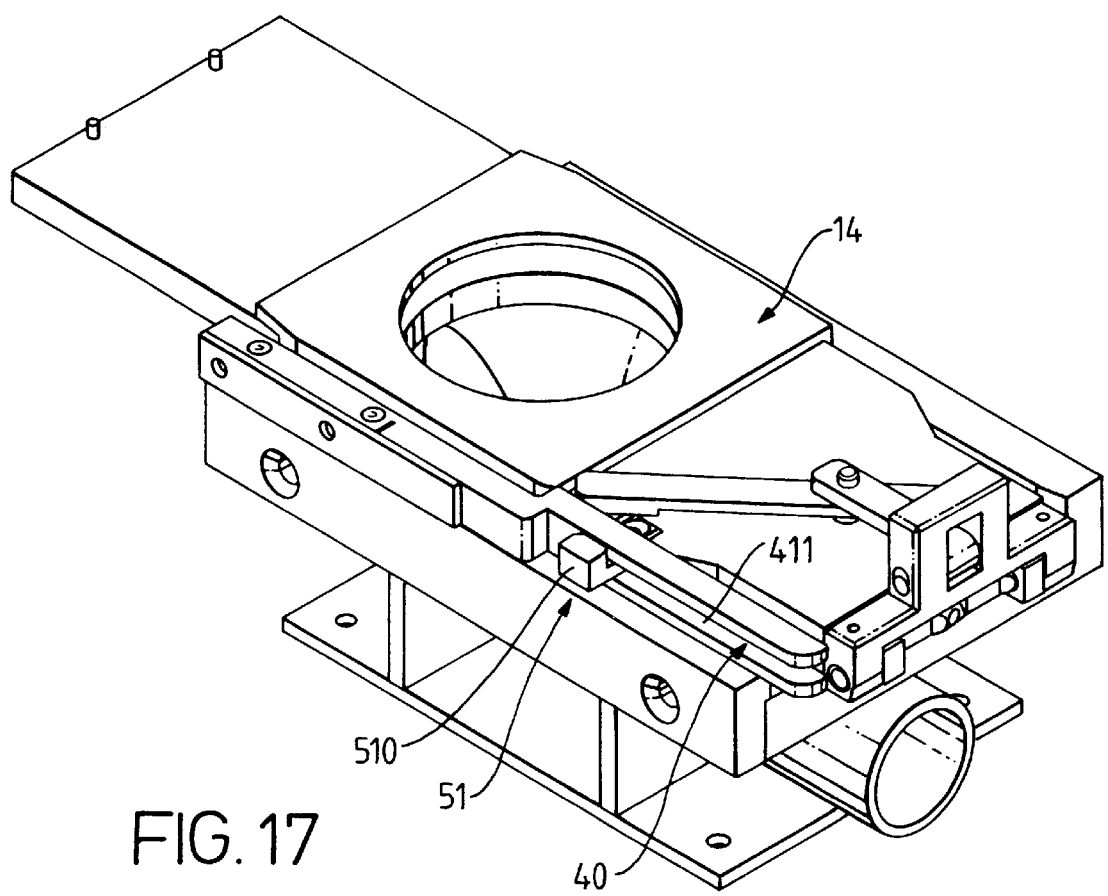
FIG. 17 is a perspective view of the embodiment of FIG. 16.

FIGS. 16 and 17 illustrate the position when the carriage is freed. The latch head moves inward with its transversal edge 45 retaining the rear edge of the carriage while simultaneously the locking means 21 is compressed that releases the gate plate that can be moved along the carriage in open or flow delivery position. As shown in FIG. 17, the delivery position corresponds to a position where the openings of the carriage, gate plate and passage of the reservoir match together. In that position, the latch lever 40 is prevented from accidentally opening thanks to the locking member 51 that is engaged in the slit 411 of the lever head.

Figure 18:
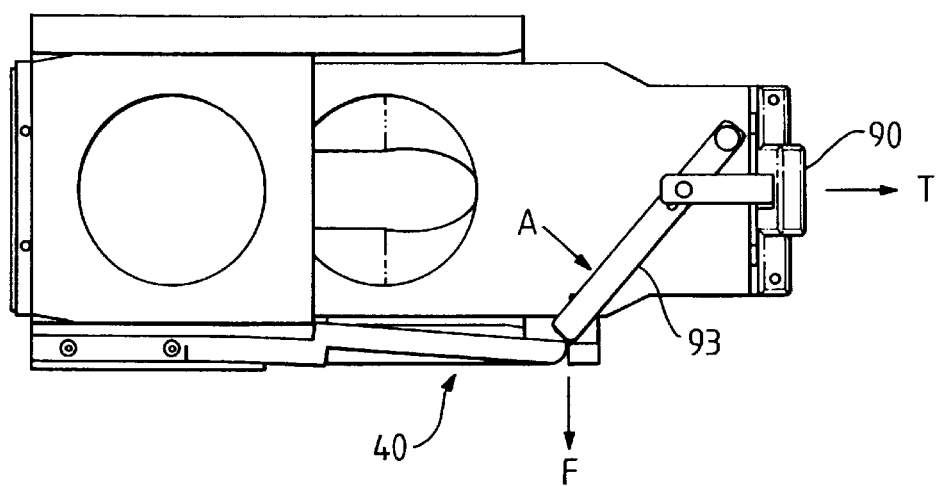
FIG. 18 is a top view illustrating the withdrawal of the container holding assembly from the reservoir assembly according to the embodiment of FIGS. 13 to 17.
Figure 19:
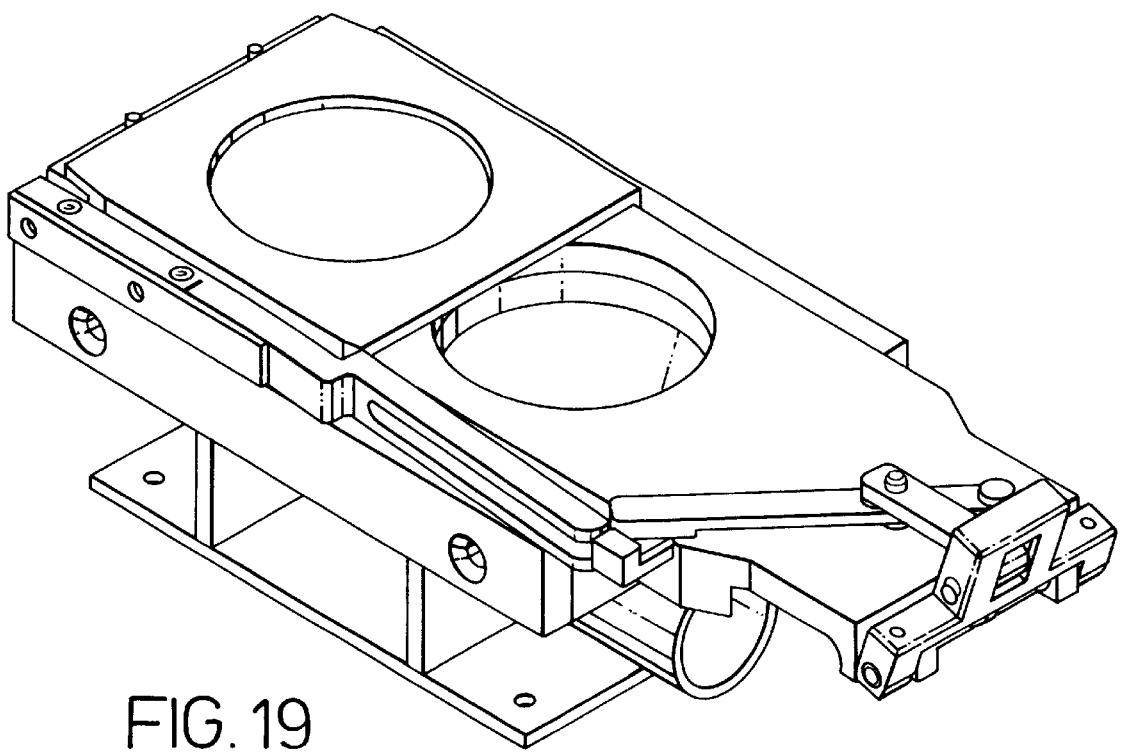
FIG. 19 is a perspective view of the embodiment of FIG. 18.

FIGS. 18 and 19 illustrate how the container holding assembly is removed from the reservoir. For that, the user simply pulls on the articulated lever in front-to-rear direction "T" as shown which causes the arm 93 to rotate along arc-shaped path "A" until the latch lever 40 opens and disengages from the transversal edge of the carriage.

Figure 20:
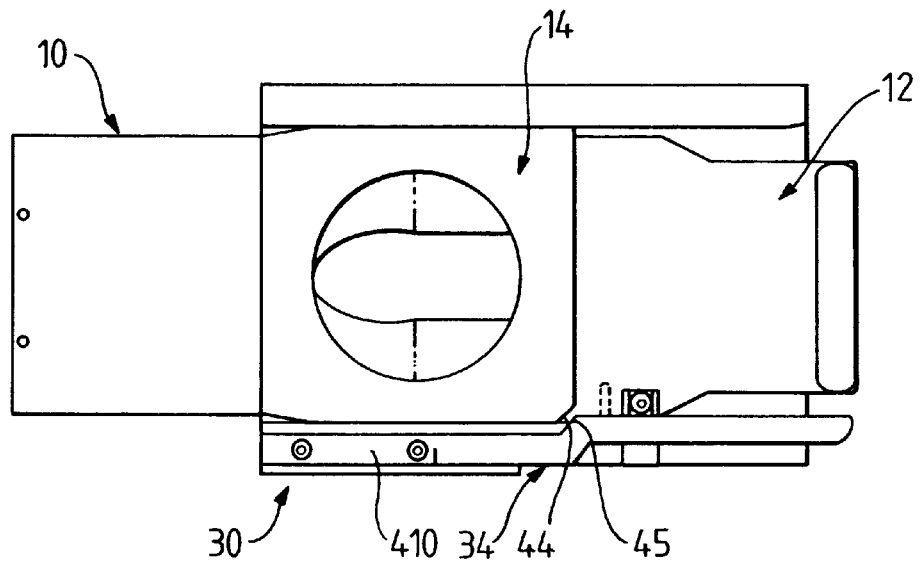
FIG. 20 represents another simplified embodiment of the invention.
Figure 21:
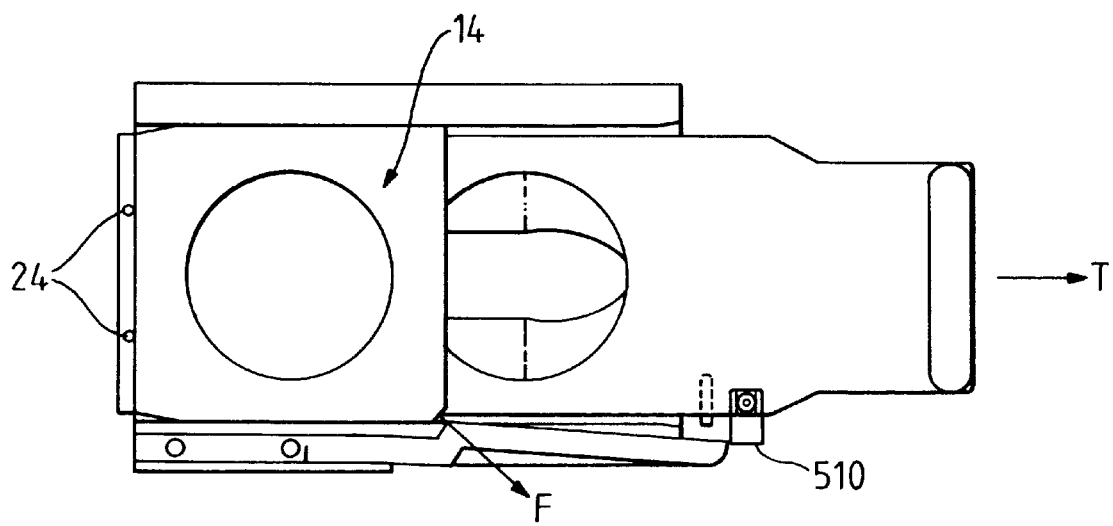
FIG. 21 illustrates the embodiment of FIG. 20 when the container holder is withdrawn from the reservoir means with the opening of the latch.

Referring to FIGS. 20 and 21 now, another embodiment is presented that is simplified with respect to the previous embodiment but performs in a manner substantially equivalent. In this embodiment, the latching means 34 creates a resistance force on the carriage 14 which can be overcome by merely exerting a pulling force in the direction "T" for disengaging the gate plate 12 from the reservoir means. For that, the latching means includes a ramp-shaped retaining surface 45 which engages a surface of the carriage, preferably also complementary shaped as a ramp, so that when the gate plate 12 comes into abutment with the carriage by abutting means 24 during the withdrawal, a further pulling in direction "T" on a simple handle results in forcing the opening of the latch head by the outward reaction force "F" created.

In the present description, the terms "powder" and "powdered" refer to any sort of solid flowable material such as powder, particulate, granules, grains, seeds, chips, flakes, etc. of any flowable particulate size.

The invention described and claimed herein is not strictly limited in scope by the specific embodiments herein disclosed. As a matter of example, the system has been described in the context of a horizontal loading. A vertical loading is also possible as an alternative delivery system. Any equivalent embodiments are intended to be within the scope of this invention. Indeed, various modifications of the invention will become apparent to those skilled in the art from the foregoing description. Such modifications are also intended to fall within the scope of the appended claims.

What is claimed is:

1. A device for dispensing a flowable substance comprising:
   a container holding assembly adapted for receiving a container that includes a flowable substance therein, and comprising:
      opening means for selectively opening the container and being adapted to move from a closed position to an open position and vice versa, and
      locking means for initially holding the opening means in the closed position of the container;
   reservoir means adapted for retaining the container holding assembly thereon and for receiving flowable substance from the container when in a delivery position; and
   means for latching the container holding assembly on the reservoir means when the container is in the delivery position.

2. A device according to claim 1, which further comprises release means for releasing the locking means with the release means being capable of actuating the locking means when the container is in the delivery position so that the opening means is capable of being moved into an open position to allow the flowable substance to flow from the container into the reservoir means.

3. A device according to claim 2, wherein the release means is coupled to the latching means so that the release of the opening means of the container holding assembly is simultaneously achieved with the latching of the container holding assembly onto the reservoir means.

4. A device according to claim 1, wherein the container holding assembly comprises integrated means for unlatching the latching means for freeing the container holding assembly.

5. A device according to claim 4, wherein the unlatching means is arranged on the container holding assembly and is configured to act by pulling the container holding assembly off the reservoir means for withdrawal of the container.

6. A device according to claim 1, which further comprises a secondary locking means for locking the latching means for more securely engaging the container holding assembly to the reservoir means in the delivery position, with the secondary locking means being arranged with respect to the opening means of the container assembly so that it becomes disengaged from the latching means when the opening means of the container holding assembly is moved into the closed position to thus prevent further flow of substance from the container into the reservoir means.

7. A device according to claim 1, wherein the container holding assembly comprises primary sliding means to move the opening means from the closed position to the open position and vice versa.

8. A device according to claim 7, wherein the container holding assembly is guided in sliding engagement onto the reservoir means by secondary sliding engaging means that include stopping means capable of stopping the container from movement past the delivery position.

9. A device according to claim 8, wherein the primary and secondary sliding means are arranged to move in the same direction so that the engagement of the container assembly and the opening of the container can be carried out sequentially during a continuous sliding motion.

10. A device according to claim 9, wherein the opening means and primary sliding means form a gate plate for slidably engaging a container carriage onto which the container is removably attached.

11. A device according to claim 10, wherein the container carriage supports a first part of the secondary sliding means and is adapted to complement a second part of the secondary sliding means of the reservoir means.

12. A device according to claim 10, wherein the gate plate and the container carriage both have openings that substantially coincide together when the container holding assembly is moved to the opening position on the reservoir means.

13. A device according to claim 12, wherein the reservoir means comprises a passage for collecting the flowable substance with the passage extending beyond the openings of the container assembly so that any excess of powder can be wiped from the gate plate and collected through the passage during the closure of the gate plate with respect to the container carriage.

14. A device according to claim 12, wherein the locking means of the container holding assembly comprises a first resilient member which locks the container carriage in a position in which the opening of the carriage is shut off by a solid closing portion of the gate plate.

15. A device according to claim 14, wherein the latching means of the reservoir means comprises a second resilient member which has a first engaging surface that compresses the first resilient member in response to the sliding engagement of the container holding assembly onto the reservoir means, thereby resulting in the release of the plate gate with respect to the container carriage.

16. A device according to claim 15, wherein the first resilient member is a spring biased blocking element and the second resilient member is a lever having a second surface extending with the first engaging surface, which second surface engages a transversal portion of the container carriage for securely holding it in the delivery position.

17. A device according to claim 1, wherein the reservoir means comprises a portion of a hopper that is configured, positioned and adapted to collect the flowable substance as it flows through the container holding assembly.

18. A device according to claim 17, wherein the container, when opened, forms an extension of the hopper and wherein the container has a capacity that exceeds the capacity of the hopper portion.

19. A device according to claim 17, wherein the reservoir means comprises a dosing assembly located at the bottom of the hopper for receiving flowable substance and for transporting a predetermined amount of flowable substance toward an outlet of the hopper portion.

20. A device according to claim 19, wherein the dosing assembly comprises a rotary auger driven in rotation by an electrically powered motor.

21. A dispensing device which includes a device according to claim 1 with the flowable substance being a powdered food or beverage.

22. A device according to claim 21, wherein the flowable substance is a milk or milk based product, soup, sauce, mashed potato or other dehydrated food product.

23. A container holding assembly configured and adapted to be attached to a container that contains a flowable food substance which comprises an opening means for selectively opening the container, the opening means being adapted to move from a closed position to an open position of the container and vice versa, and locking means for holding the opening means in the closed position; wherein the locking means is configured for operative association with release means of a reservoir assembly and is arranged so that release of the opening means from the locking means is effected when the container holding assembly is held in a fixed position for delivering the flowable food substance into the reservoir means.

24. A container holding assembly according to claim 23, wherein the container opening assembly further comprises a container carriage with a main opening onto which the container is attached by connection means and a gate plate slidably engaging the container carriage, wherein the locking means are arranged to hold the container carriage in a non-delivery position in which the opening is obturated by the gate plate.

25. A container holding assembly according to claim 24, wherein the container carriage includes a retaining portion adapted to engage latching means carried by the reservoir assembly to lock the carriage in a position where the main opening of the carriage substantially matches a passage of the reservoir assembly.

26. A container holding assembly according to claim 25, wherein the gate plate includes means for unlatching the latching means of the reservoir means, with the unlatching means being arranged to act when a force is exerted in the longitudinal direction of withdrawal of the container from the reservoir means.

27. A container holding assembly according to claim 26, wherein the unlatching means includes an articulated handle on the gate plate that connects to an actuating arm adapted to force the latching means to disengage from the retaining portion of the carriage when the articulated handle is pulled.

28. A container assembly comprising a container holding assembly according to claim 23 with a container attached to it.

29. A container assembly according to claim 24, wherein the container is attached to the holding assembly by a removable connection that includes screw threads or a snap fitting connection.

30. A device for dispensing a flowable substance comprising:
(i) a cartridge holder adapted for receiving a refill cartridge containing a flowable substance comprising an apertured plate member for selectively opening of the cartridge, whereby the plate member is adapted to move from a closed position, where a portion of the plate member obturates the cartridge, to an open position where the plate member leaves the cartridge open, and vice versa, wherein the apertured plate member is initially maintained with the cartridge in the closed position; and
(ii) a hopper adapted to receive the cartridge holder in a delivery position for receiving the flowable substance from the cartridge, wherein the hopper is adapted to release the apertured plate member when the cartridge holder engages the hopper in the delivery position such that the cartridge holder is capable of being moved from the closed position to the open position thereby allowing flowable substance to flow from the cartridge into the hopper.

31. A device according to claim 30, wherein the apertured plate is slidably connectable to the cartridge.

32. A device according to claim 31, wherein the apertured plate is slidably connectable by a carriage attached to the cartridge.

33. A device according to claim 30, wherein the cartridge is capable of being latched in a stable delivery position onto the hopper while the apertured plate is manually slid into the open position.

34. A device according to claim 30, wherein the cartridge is securely latched to the hopper and is releasable only when the closed position of the apertured plate is restored.

35. A device according to claim 34, wherein the cartridge is releasable by pulling the apertured plate in the same direction as the direction for restoring the closed position of the apertured plate.

36. A device according to claim 30, wherein the hopper has an extended volume area adapted sufficient to receive flowable substance that is wiped when the apertured plate is moved to the closed position.

37. A device according to claim 30, wherein the flowable substance is a powdered food or beverage substance.

38. A device according to claim 30, wherein the refill cartridge has a capacity higher than the capacity of the hopper.

39. A device according to claim 30, wherein the hopper is adapted to dose the flowable substance to a mixing zone in order to prepare a beverage or food.

40. A device according to claim 30, wherein the hopper comprises a dosing screw adapted to move the flowable substance from the extended volume area to the mixing zone.

41. A device according to claim 30, wherein the hopper has sloped sidewalls forming an angle of between about 15 to 30 degrees with respect to the direction of gravity.

42. A cartridge assembly comprising:
a cartridge containing a food or beverage powder; and
a cartridge holder adapted for receiving the cartridge comprising an apertured plate member for selectively opening the cartridge, with the plate member being adapted to move from a closed position, wherein a portion of the plate member obturates the cartridge, to an open position wherein the plate member leaves the cartridge open, and vice versa, wherein the apertured plate member is locked to the cartridge in the closed position; and is adapted to be released when the cartridge holder is fixedly engaged in a hopper with the plate member in the open position for delivering the flowable substance from the cartridge.

43. A method for rapidly and cleanly delivering a powder into a reservoir assembly from a container containing the powder which comprises: providing a container holder adapted for receiving the container; the container holder comprising an apertured means for selectively opening the container whereby the apertured means is adapted to move from a closed position, wherein a portion of the apertured means obturates the container, to an open position of the container wherein the apertured means leaves the container open and vice versa, wherein the apertured means is locked to the container in a closed position of the container; and is released as resulting from the container holder securely engaging onto the reservoir assembly in a delivery position with the apertured means in the open position for delivering the flowable substance from the container.

44. The method according to claim 43, wherein the container is attached to the container holder before loading in the reservoir assembly as the container holder is in closed position by the apertured means.

45. The method according to claim 43, wherein the container holder is capable of being removed from the reservoir assembly only when the container is returned to the closed position by the apertured means.

46. A method for conveniently removing a charging container from a hopper assembly in a limited space area which comprises providing a container holder adapted to attach to the container and having a gate portion adapted to move relative to the container to open or close the container, providing a hopper assembly, providing means for complementary fitting the container holder and the hopper assembly in a fitting direction, providing means for securing the container on the hopper assembly, and providing means for unlatching the container which acts when the container holder is pulled in a direction opposite to the fitting direction, thus allowing the charging container to be easily removed from the hopper.

47. A method for dispensing a flowable food substance in a convenient manner while protecting quality of the substance delivered which comprises providing a charging container having an interface that closes the container and that complementary fits a reservoir of the dispensing device, securely fitting the charging container top-down on the reservoir while the interface complementary fitting onto the reservoir wherein resulting from the interface securely fitted onto the reservoir, the flow communication can be established, leaving the charging container as an extension of the reservoir.

48. The method according to claim 47 wherein the container is made of moisture barrier material.

49. The method according to claim 48 wherein the container is made of oxygen barrier material.

\* \* \* \* \*